United States Patent
Kawase

(10) Patent No.: US 9,190,690 B2
(45) Date of Patent: Nov. 17, 2015

(54) MOLTEN CARBONATE FUEL CELL

(71) Applicant: CENTRAL RESEARCH INSTITUTE OF ELECTRIC POWER INDUSTRY, Tokyo (JP)

(72) Inventor: Makoto Kawase, Kanagawa (JP)

(73) Assignee: CENTRAL RESEARCH INSTITUTE OF ELECTRIC POWER INDUSTRY, Tokyo (JP)

(*) Notice: Subject to any disclaimer, the term of this patent is extended or adjusted under 35 U.S.C. 154(b) by 247 days.

(21) Appl. No.: 13/777,372

(22) Filed: Feb. 26, 2013

(65) Prior Publication Data

US 2013/0224621 A1 Aug. 29, 2013

(30) Foreign Application Priority Data

Feb. 29, 2012 (JP) .................. 2012-044790

(51) Int. Cl.
*H01M 8/14* (2006.01)

(52) U.S. Cl.
CPC .............. *H01M 8/145* (2013.01); *H01M 8/141* (2013.01); *H01M 2008/147* (2013.01); *Y02E 60/526* (2013.01)

(58) Field of Classification Search
CPC .......... H01M 2008/147; H01M 8/141; H01M 8/145; Y02E 60/526
USPC ....................................... 429/478
See application file for complete search history.

(56) References Cited

U.S. PATENT DOCUMENTS

| | | | | |
|---|---|---|---|---|
| 6,007,932 | A * | 12/1999 | Steyn | 429/456 |
| 2005/0196656 | A1* | 9/2005 | Gomez | 429/30 |
| 2010/0104910 | A1* | 4/2010 | Devoe et al. | 429/26 |
| 2011/0250521 | A1* | 10/2011 | Moon et al. | 429/478 |

FOREIGN PATENT DOCUMENTS

| | | |
|---|---|---|
| EP | 798800 A2 * | 10/1997 |
| JP | 09-259910 | 10/1997 |
| JP | 2001-297780 | 10/2001 |
| JP | 2006-179295 | 7/2006 |
| JP | 2007-265845 | 10/2007 |

OTHER PUBLICATIONS

EP 798800 A2, Uematsu, Hiroyoshi, Oct. 1997, EPO.*
KR Office Action dated Mar. 14, 2014; Application No. 10-2013-0021075.

* cited by examiner

*Primary Examiner* — Jonathan Jelsma
*Assistant Examiner* — Rashid Alam
(74) *Attorney, Agent, or Firm* — Young & Thompson

(57) ABSTRACT

A molten carbonate fuel cell, which makes a separator unnecessary, cuts down the number of components, and markedly reduces the costs, is provided. In the cell, a cathode, an electrolyte plate holding an electrolyte, and an anode are provided concentrically with a tube body, the electrolyte plate is held by the anode, and the electrolyte plate is sandwiched between the anode and the cathode, so that the cell is constructed without the use of a separator.

12 Claims, 6 Drawing Sheets

MOLTEN CARBONATE FUEL CELL

The entire disclosure of Japanese Patent Application No. 2012-044790 filed on Feb. 29, 2012 is expressly incorporated by reference herein.

TECHNICAL FIELD

This invention relates to a molten carbonate fuel cell intended to achieve a marked cost reduction and a shortened starting time.

BACKGROUND ART

A molten carbonate fuel cell is constituted by interposing an electrolyte plate between an anode (fuel electrode) and a cathode (oxidant electrode) to form a flat plate-shaped electrolyte electrode assembly, and stacking the electrolyte electrode assemblies in a plurality of layers, with separators being arranged therebetween. In the separator, an oxidant gas channel and a fuel gas channel are formed (see, for example, Patent Document 1). A fuel gas is supplied to the anode, and an oxidant gas is supplied to the cathode, via the separator, whereupon an electrochemical reaction takes place via the electrolyte to obtain electric power.

The molten carbonate fuel cell, which has been known so far, holds a liquid molten carbonate in the electrolyte plate. Thus, the separator needs to have the shape of the gas channel or the like controlled with high accuracy, and the shapes of the anode and the cathode need to be controlled highly accurately. Moreover, the flat plate-shaped electrolyte electrode assemblies are stacked, with the separators interposed therebetween, thereby constituting a fuel cell stack. Thus, a device for clamping the plate members is required. At start-up, stresses act on the electrolyte electrode assemblies, and influence each other via the separators. Hence, the fuel cell has taken time until it reaches the operating temperature.

With the molten carbonate fuel cell, therefore, high accuracy has been demanded of its components, and the number of the components for constituting the fuel cell has increased, leading to hikes in the manufacturing costs. Moreover, a certain degree of starting time has been required until a desired output is obtained.

PRIOR ART DOCUMENTS

Patent Documents

[Patent Document 1] JP-A-2007-265845

SUMMARY OF THE INVENTION

Problems to be Solved by the Invention

The present invention has been accomplished in the light of the above-mentioned circumstances. It is an object of the present invention to provide a molten carbonate fuel cell which can obviate the need for the separator, cut down the number of the components, markedly reduce the costs, and can also shorten the starting time.

Means for Solving the Problems

A first aspect of the present invention, intended to attain the above object, is a molten carbonate fuel cell, comprising: a tube body having many holes in a tubular surface thereof; a tubular first electrode provided around the tubular surface of the tube body; a tubular electrolyte plate which is provided around the first electrode, which the first electrode contacts, and which holds an electrolyte; and a tubular second electrode which is provided around the electrolyte plate, and which makes contact with the electrolyte plate to hold the electrolyte plate, wherein an oxidant gas or a fuel gas is supplied inside the tube body, and a fuel gas or an oxidant gas is supplied to the second electrode, whereby an electrochemical reaction occurs to obtain electric power.

According to the first aspect of the present invention, the first electrode, the electrolyte plate, and the second electrode are provided concentrically with the tube body, and the electrolyte plate is held by the tubular second electrode. Thus, the cell equipped with the anode and the cathode, with the electrolyte plate being sandwiched therebetween, can be constructed, without the use of a separator. Even if a plurality of the cells are provided, stresses acting on the plurality of cells at start-up do not influence each other. Hence, the time taken until the desired operating temperature is reached can be shortened, and the starting time until the desired output is obtained can be shortened.

Consequently, it becomes possible to obviate the need for a separator, cut down the number of the components, markedly reduce the costs, and also shorten the starting time.

The tube body is preferably made of a metal. The first electrode and the second electrode are each constituted by sintering a slurry containing a powder of Ni as a principal ingredient. The electrolyte plate has a carbonate held in $LiAlO_2$.

A second aspect of the present invention is the molten carbonate fuel cell according to the first aspect, wherein the first electrode is a cathode, and the second electrode is an anode; a material constituting the anode is sintered, whereby the anode is clamped diametrically inwardly, and the electrolyte plate is sandwiched and held between the anode and the cathode; and the oxidant gas is supplied from inside the tube body to the cathode through the many holes, and the fuel gas is supplied to the anode.

A third aspect of the present invention is the molten carbonate fuel cell according to the second aspect, wherein the anode is provided with a stress reduction member.

According to the second and third aspects, an oxidant gas is supplied from inside the tube body to the cathode through the many holes, and a fuel gas is supplied from the outer peripheral portion to the anode. As a result, an electrochemical reaction is caused by the oxidant gas and the fuel gas via the electrolyte to be capable of obtaining electric power.

A fourth aspect of the present invention is the molten carbonate fuel cell according to the first aspect, wherein the first electrode is an anode, and the second electrode is a cathode; a multi-hole tube made of a metal is disposed around the cathode; a material constituting the cathode is sintered, whereby the cathode is clamped diametrically inwardly, and when the cathode is oxidized, a state of the cathode being clamped diametrically inwardly is maintained by the multi-hole tube, and the electrolyte plate is sandwiched and held between the cathode and the anode; and the fuel gas is supplied from inside the tube body to the anode through the many holes, and the oxidant gas is supplied to the cathode.

According to the fourth aspect, after the material constituting the cathode is sintered, the metallic multi-hole tube is disposed around the cathode. Since the material constituting the cathode is sintered, the cathode is clamped diametrically inwardly. Also, when the cathode is oxidized, the state where the cathode is clamped diametrically inwardly is maintained by the multi-hole tube. A fuel gas is supplied from inside the tube body to the anode through the many holes, and an oxidant gas is supplied from the outer peripheral portion to the cathode. As a result, an electrochemical reaction is caused by the oxidant gas and the fuel gas via the electrolyte to be capable of obtaining electric power.

A fifth aspect of the present invention is the molten carbonate fuel cell according to any one of the first to fourth aspects, wherein a diffusion member for diffusing the gas which flows is provided on an inner periphery of the tube body.

According to the fifth aspect, the gas supplied to the inner periphery of the tube body can be diffused by the diffusion member.

A sixth aspect of the present invention is the molten carbonate fuel cell according to any one of the first to fifth aspects, wherein the tube body is mounted in a casing.

According to the sixth aspect, the desired number of the tube bodies are mounted individually in the casing, so that a molten carbonate fuel cell system of a desired output can be constructed, without stacking of the cells in intimate contact with each other.

Effects of the Invention

The molten carbonate fuel cell of the present invention can make a separator unnecessary, cut down the number of the components, and markedly reduce the costs.

MODE FOR CARRYING OUT THE INVENTION

Figure 1:
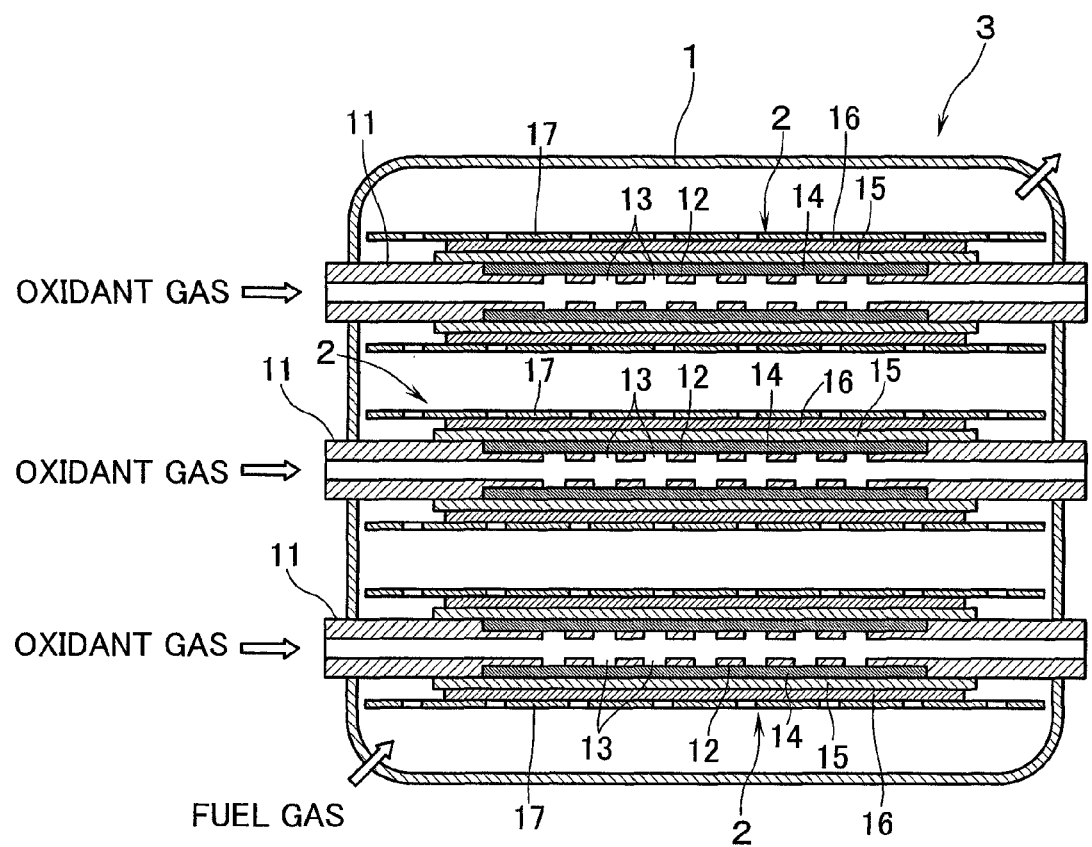
[FIG. 1] is a sectional appearance drawing of cell equipment equipped with molten carbonate fuel cells according to a first embodiment of the present invention.
Figure 2:
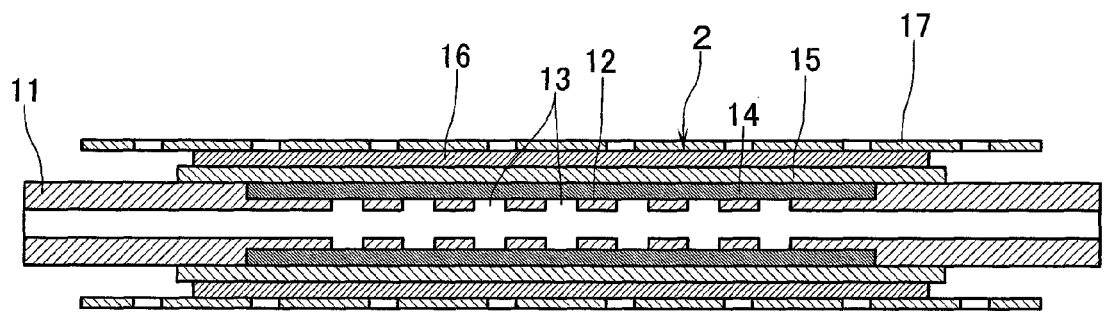
[FIG. 2] is a sectional view showing the schematic configuration of the molten carbonate fuel cell according to the first embodiment of the present invention.
Figure 3:
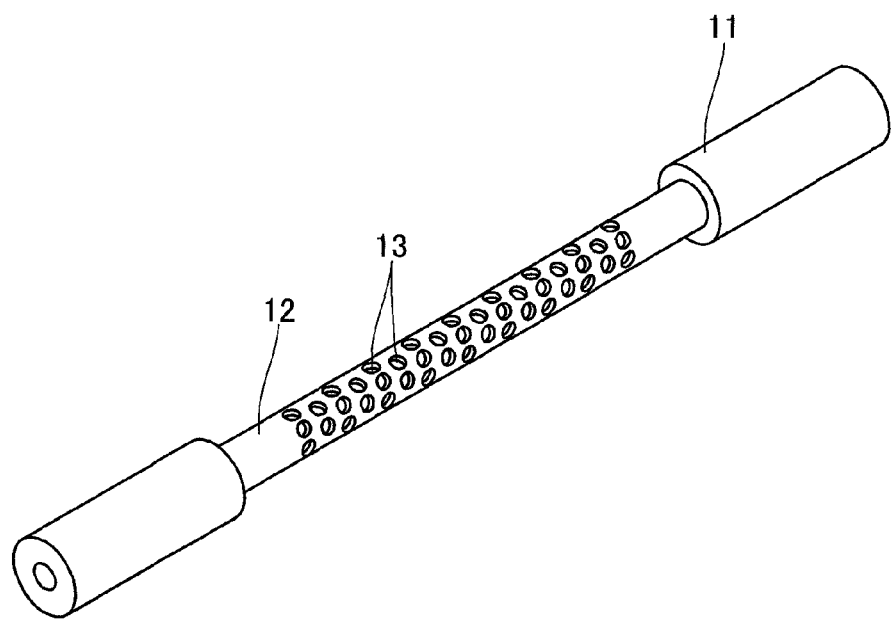
[FIG. 3] is an appearance drawing of a tube body.
Figure 4:
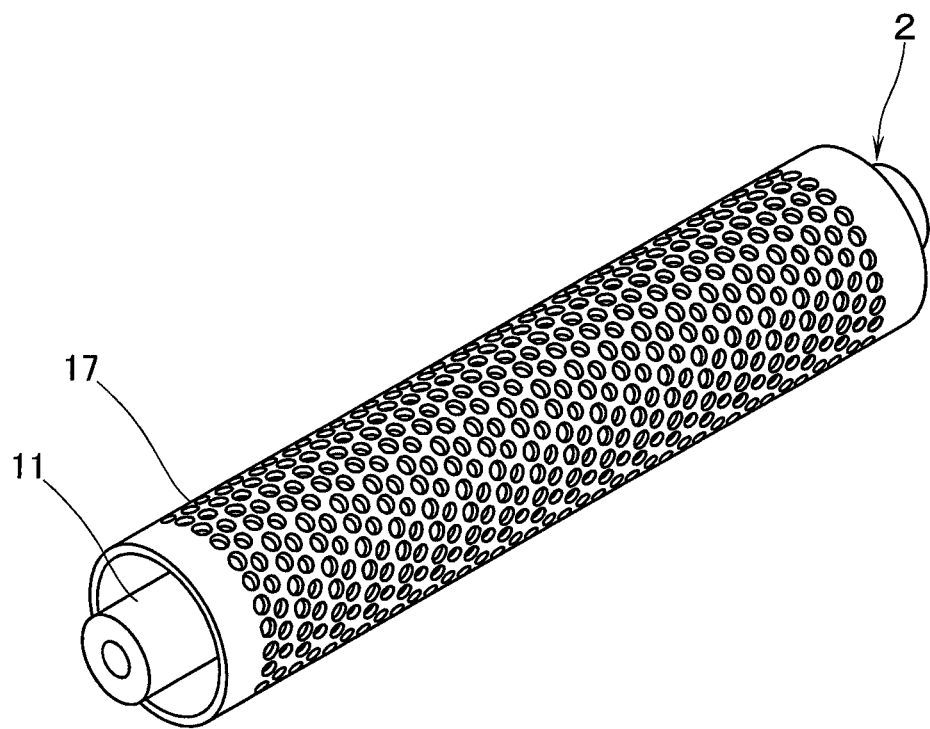
[FIG. 4] is an appearance drawing of the molten carbonate fuel cell.

FIG. 1 shows an exterior section of cell equipment equipped with molten carbonate fuel cells according to a first embodiment of the present invention. FIG. 2 shows a section illustrating the schematic configuration of the molten carbonate fuel cell according to the first embodiment of the present invention. FIG. 3 shows the appearance of a tube body. FIG. 4 shows the appearance of the molten carbonate fuel cell. FIGS. 5A to 5F represent the procedure for manufacture of the molten carbonate fuel cell according to the first embodiment of the present invention.

As shown in FIG. 1, a plurality of (3 in the illustrated embodiment) molten carbonate fuel cells (MCFCs) 2 are mounted individually in a hollow casing 1 to construct cell equipment 3. That is, end portions of a tube body 11 of each MCFC 2 are fixed to a wall portion of the casing 1, and both ends of the tube body 11 face the outside. An oxidant gas is supplied to the inner periphery of the tube body 11, while a fuel gas is supplied to the interior of the casing 1 (an external portion of the MCFC 2).

By mounting the desired number of the tube bodies 11 individually in the casing 1, it becomes possible to construct a molten carbonate fuel cell system of a desired output, without stacking the plurality of MCFCs 2 in intimate contact with each other as unit cells. Thus, a molten carbonate fuel cell system for obtaining the desired output can be constructed with a simple structure. Moreover, stresses acting on the MCFCs 2 at start-up do not influence each other in the respective MCFCs 2. Thus, the time taken until a desired operating temperature is reached can be shortened, and the starting time until the desired output is obtained can be shortened.

As shown in FIGS. 1, 2 and 3, many holes 13 are formed, for example, in the tubular surface of a middle portion 12 of the tube body 11 made of stainless steel. A diffusion member (fin) for diffusing a gas (an oxidant gas to be described later) flowing on the inner periphery of the tube body 11 can be provided on the inner periphery.

As shown in FIGS. 1 and 2, a tubular cathode 14 as a first electrode is provided around the tubular surface of the middle portion 12, and a tubular electrolyte plate 15, as an electrode plate, which contacts and which holds (is impregnated with) an electrolyte, is provided around the cathode 14. A tubular anode 16, as a second electrode, which makes contact with the electrolyte plate 15 to hold the electrolyte plate 15, is provided around the electrolyte plate 15.

Further, as shown in FIGS. 1, 2 and 4, a punch plate 17 having many holes formed therein is wrapped around the anode 16. Since the punch plate 17 is wrapped around the anode 16, the electrolyte plate 15 is surely held by the anode 16. The punch plate 17 can be omitted.

With the above-mentioned MCFC 2, an oxidant gas is supplied inside the tube body 11, and a fuel gas is supplied inwardly of the casing 1 (outwardly of the MCFC 2). Because of this feature, an electrochemical reaction is caused via the electrolyte held in (impregnated into) the electrolyte plate 15 to obtain electric power.

In the above MCFC 2, the cathode 14, the electrolyte plate 15 and the anode 16 are provided concentrically with the tube body 11, and the electrolyte plate 15 is held by the anode 16. Thus, a cell having the anode 16 and the cathode 14, with the electrolyte plate 15 interposed therebetween, can be constructed without the use of a separator. Consequently, the separator becomes unnecessary, and the number of the components can be decreased, so that the cost can be reduced markedly.

The procedure for the manufacture of the MCFC 2 will be described based on FIGS. 5A to 5F.

Figure 5A:
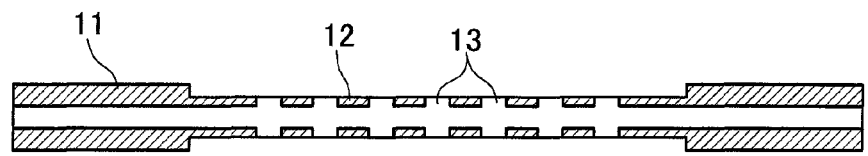
[FIGS. 5A to 5F] are a process chart of manufacture.
Figure 5B:
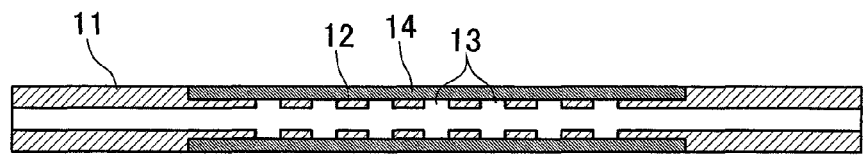

As shown in FIG. 5A, the stainless steel tube body 11 having the many holes 13 formed in the tubular surface of the middle portion 12 is rendered ready for use. As shown in FIG. 5B, the middle portion 12 is coated with a material for constituting the cathode 14, whereafter the material is dried and sintered to form the cathode 14. The material used for constituting the cathode 14 is a slurry containing a powder of Ni as a main ingredient.

Figure 5C:
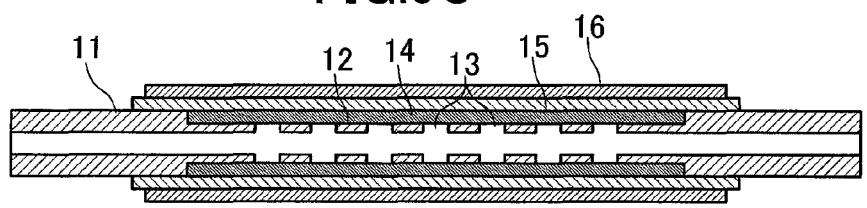

As shown in FIG. 5C, a material for constituting the electrolyte plate 15 is coated on the outer peripheral surface of the cathode 14, and dried. Further, a material for constituting the anode 16 is coated on the above material, and dried. The material for constituting the electrolyte plate 15, and the material for constituting the anode 16 are sintered to form the electrolyte plate 15 and the anode 16. The material used to constitute the anode 16 is a slurry containing a powder of Ni as a principal ingredient. The material for constituting the electrolyte plate 15 is composed of a slurry containing a powder of $LiAlO_2$ holding a carbonate.

The material for constituting the anode 16 is sintered, whereby the material shrinks. As a result, a clamping force occurs in the anode 16, whereupon the electrolyte plate 15 is reliably held on the side of the tube body 11. Consequently, contact resistance between the anode 16 and the electrolyte plate 15, and that between the electrolyte plate 15 and the cathode 14 are decreased, so that a gas leak is suppressed.

Figure 5D:
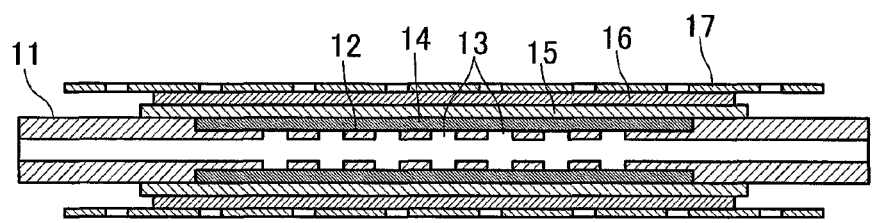

As shown in FIG. 5D, the punch plate 17 is mounted on the outer periphery of the anode 16 to assist in exhibiting the clamping effects (reduction in contact resistance, suppression of gas leakage). The punch plate 17 is metallic, and is composed of, for example, Ni.

Figure 5E:
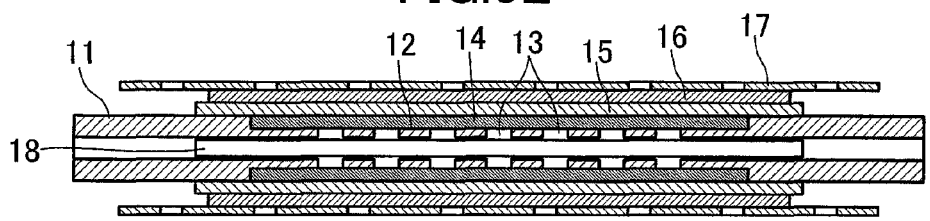
Figure 5F:
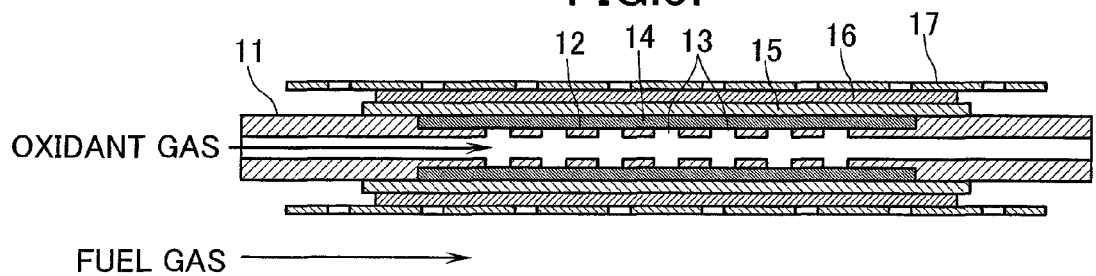

As shown in FIG. 5E, a solid molten carbonate 18 is placed on the inner periphery of the tube body 11, and the carbonate is melted in a reducing atmosphere. By melting the carbonate, the cathode 14, the electrolyte plate 15 and the anode 16 are impregnated with the carbonate. As shown in FIG. 5F, an oxidant gas is flowed along the inner periphery of the tube body 11 to carry out the oxidation and lithiation of the cathode 14, thereby bringing the cathode 14 into the state of Li-converted NiO.

By the steps in FIGS. 5A to 5E, the cathode 14 is provided as the first electrode on the tube body 11, the electrolyte plate 15 impregnated with the molten carbonate is provided, the anode 16 is further provided as the second electrode on the outer periphery of the electrolyte plate 15, and the anode 16 is clamped diametrically inwardly, whereby the electrolyte plate 15 is sandwiched and held between the anode 16 and the cathode 14. In this manner, the MCFC 2 can be constituted.

Figure 6:
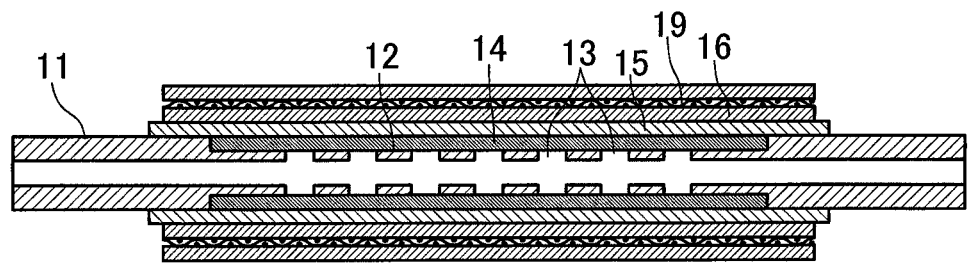
[FIG. 6] is a sectional view of a molten carbonate fuel cell according to another embodiment.

As shown in FIG. 6, a mesh 19 can be wrapped about the anode 16 as a stress reduction member for preventing cracks. As the stress reduction member, the mesh 19 is not limitative, and the use of other member, such as a wire or a fiber material interposed, is also possible.

A second embodiment of the present invention will be described based on FIGS. 7 and 8.

Figure 7:
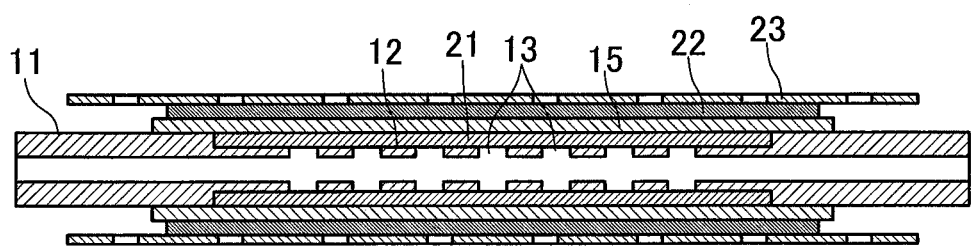
[FIG. 7] is a sectional view showing the schematic configuration of a molten carbonate fuel cell according to a second embodiment of the present invention.

FIG. 7 shows a section illustrating the schematic configuration of a molten carbonate fuel cell according to a second embodiment of the present invention. FIG. 8 shows a section of the appearance of cell equipment equipped with the molten carbonate fuel cells according to the second embodiment of the present invention. FIG. 7 and FIG. 8 correspond to FIG. 2 and FIG. 1, respectively, in the first embodiment. The same members as in the first embodiment are assigned the same numerals as in the first embodiment.

As shown in FIG. 7, a tubular anode 21 (anode material) as a first electrode is provided around the tubular surface of a middle portion 12 of a tube body 11, and a tubular electrolyte plate 15 is provided around the anode 21. A tubular cathode 22, as a second electrode, which makes contact with the electrolyte plate 15, is provided around the electrolyte plate 15. A multi-hole tube 23 made of a metal is disposed around the cathode 22, and the cathode 22 is held by the multi-hole tube 23.

The multi-hole tube 23, as will be described later, is disposed around the cathode 22 after a material for constituting the cathode 22 is sintered.

Materials for constituting the anode 21 and the cathode 22 are each constituted by sintering a slurry containing a powder of Ni as a principal ingredient. The material for constituting the cathode 22 is sintered, whereby the material shrinks to contract the cathode 22. Even if the state of shrinkage of the cathode 22 changes during oxidation of the cathode 22, the state where the cathode 22 is clamped diametrically inwardly is maintained by the multi-hole tube 23, so that the electrolyte plate 15 is sandwiched and held between the cathode 22 and the anode 21.

Figure 8:
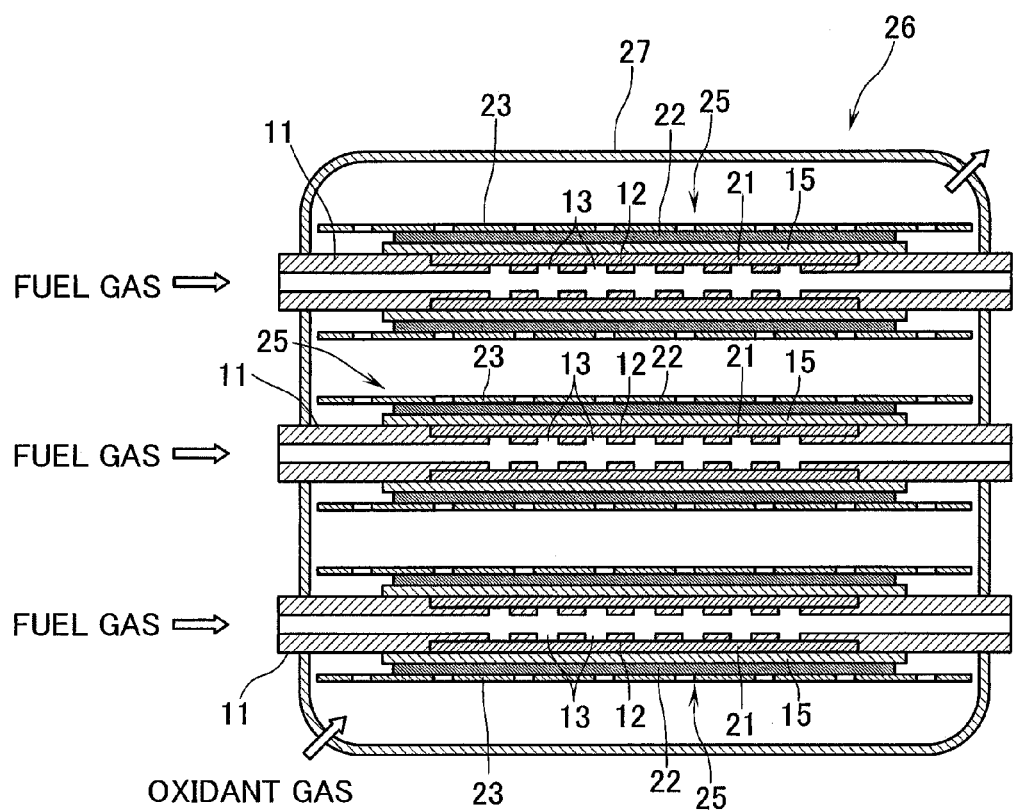
[FIG. 8] is a sectional appearance drawing of cell equipment equipped with the molten carbonate fuel cells according to the second embodiment of the present invention.

As shown in FIG. 8, MCFCs 25 of the above-described configuration are mounted individually in a hollow casing 27 to construct cell equipment 26. That is, end portions of a tube body 11 of each MCFC 25 are fixed to a wall portion of the casing 27, and both ends of the tube body 11 face the outside.

A fuel gas is supplied to the inner periphery of the tube body 11, while an oxidant gas is supplied to the interior of the casing 27 (an external portion of the MCFC 25).

By mounting the desired number of the tube bodies 11 individually in the casing 27, it becomes possible to construct a molten carbonate fuel cell system of a desired output, without stacking the plurality of MCFCs 25 in intimate contact with each other as unit cells. Thus, a molten carbonate fuel cell system for obtaining the desired output can be constructed with a simple structure.

The foregoing molten carbonate fuel cell can be constructed as a molten carbonate fuel cell which needs no separator, and which can cut down the number of the components, reduce the cost markedly, and shorten the starting time. Hence, by setting the number of the MCFCs 2 or 25, as appropriate, downsized cell equipment to upsized cell equipment can be manufactured at markedly reduced costs.

INDUSTRIAL APPLICABILITY

The present invention can be utilized in the industrial field of molten carbonate fuel cells.

EXPLANATIONS OF LETTERS OR NUMERALS 1, 27 Casing
2, 25 Molten carbonate fuel cell (MCFC)
3, 26 Cell equipment
11 Tube body
12 Middle portion
13 Hole
14, 22 Cathode
15 Electrolyte plate
16, 21 Anode
17 Punch plate
18 Molten carbonate
19 Mesh
23 Multi-hole tube

The invention claimed is:

1. A molten carbonate fuel cell, comprising:
a tube body having many holes in a tubular surface thereof;
a tubular first electrode provided around the tubular surface of the tube body;
a tubular electrolyte plate which is provided around the first electrode, which the first electrode contacts, and which holds an electrolyte; and
a tubular second electrode which is provided around the electrolyte plate, and which makes contact with the electrolyte plate to hold the electrolyte plate,
wherein an oxidant gas or a fuel gas is supplied inside the tube body, and a fuel gas or an oxidant gas is supplied to the second electrode, whereby an electrochemical reaction occurs to obtain electric power,
the first electrode is a cathode, and the second electrode is an anode,
a material constituting the anode is sintered, whereby the anode is clamped diametrically inwardly, and the electrolyte plate is sandwiched and held between the anode and the cathode, and the oxidant gas is supplied from inside the tube body to the cathode through the many holes, and the fuel gas is supplied to the anode.

2. The molten carbonate fuel cell according to claim 1, wherein the anode is provided with a stress reduction member.

3. The molten carbonate fuel cell according to claim 1, wherein a diffusion member for diffusing the gas which flows is provided on an inner periphery of the tube body.

4. The molten carbonate fuel cell according to claim 2, wherein a diffusion member for diffusing the gas which flows is provided on an inner periphery of the tube body.

5. The molten carbonate fuel cell according to claim 1, wherein the tube body is mounted in a casing.

6. The molten carbonate fuel cell according to claim 2, wherein the tube body is mounted in a casing.

7. The molten carbonate fuel cell according to claim 3, wherein the tube body is mounted in a casing.

8. The molten carbonate fuel cell according to claim 4, wherein the tube body is mounted in a casing.

9. The molten carbonate fuel cell according to claim 1, wherein the anode is sintered Ni powder.

10. The molten carbonate fuel cell according to claim 1, wherein the cathode is sintered Ni powder.

11. The molten carbonate fuel cell according to claim 1, wherein the electrolyte plate comprises carbonate held in $LiAlO_2$.

12. A molten carbonate fuel cell, comprising:
a tube body having many holes in a tubular surface thereof;
a tubular sintered Ni cathode provided around the tubular surface of the tube body;
a tubular electrolyte plate which is provided around the first electrode, which the first electrode contacts, and which holds an electrolyte, the electrolyte plate comprising carbonate held in $LiAlO_2$; and
a tubular sintered Ni anode which is provided around the electrolyte plate, and which makes contact with the electrolyte plate to hold the electrolyte plate,
wherein an oxidant gas or a fuel gas is supplied inside the tube body, and a fuel gas or an oxidant gas is supplied to the second electrode, whereby an electrochemical reaction occurs to obtain electric power,
the anode is clamped diametrically inwardly by sintering, and the electrolyte plate is sandwiched and held between the anode and the cathode, and
the oxidant gas is supplied from inside the tube body to the cathode through the many holes, and the fuel gas is supplied to the anode.

* * * * *